(12) United States Patent
Everett et al.

(10) Patent No.: US 6,220,510 B1
(45) Date of Patent: *Apr. 24, 2001

(54) MULTI-APPLICATION IC CARD WITH DELEGATION FEATURE

(75) Inventors: David Barrington Everett, East Sussex; Stuart James Miller, Berks; Anthony David Peacham, Kent; Ian Stephen Simmons, Cambs; Timothy Philip Richards, Herts; John Charles Viner, Windlesham, all of (GB)

(73) Assignee: Mondex International Limited, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,915

(22) Filed: Apr. 23, 1998

Related U.S. Application Data

(60) Provisional application No. 60/046,514, filed on May 15, 1997, and provisional application No. 60/046,543, filed on May 15, 1997.

(51) Int. Cl.⁷ ..................................................... G06K 5/00
(52) U.S. Cl. ............................ 235/380; 235/379; 705/41
(58) Field of Search .................................... 235/379, 380, 235/492; 705/41

(56) References Cited

U.S. PATENT DOCUMENTS

| | | |
|---|---|---|
| 4,214,230 | 7/1980 | Fak et al. . |
| 4,218,582 | 8/1980 | Hellman et al. . |
| 4,259,720 | 3/1981 | Campbell . |
| 4,302,810 | 11/1981 | Bouricius et al. . |
| 4,305,059 | 12/1981 | Benton . |
| 4,321,672 | 3/1982 | Braun et al. . |
| 4,341,951 | 7/1982 | Benton . |
| 4,405,829 | 9/1983 | Rivest et al. . |
| 4,408,203 | 10/1983 | Campbell . |
| 4,423,287 | 12/1983 | Zeidler . |

(List continued on next page.)

FOREIGN PATENT DOCUMENTS

| | | |
|---|---|---|
| 0152024 | 8/1985 | (EP) . |
| 0157303 | 10/1985 | (EP) . |
| 0190733 | 8/1986 | (EP) . |
| 0218176 | 4/1987 | (EP) . |
| 0261030 | 3/1988 | (EP) . |

(List continued on next page.)

OTHER PUBLICATIONS

Davies et al., "Security for Computer Networks: An Introduction to Data Security in Teleprocessing and Electronic Funds Transfer," John Wiley & Sons 1984.

*Primary Examiner*—Mark Tremblay
(74) *Attorney, Agent, or Firm*—Baker Botts L.L.P.

(57) ABSTRACT

A multi-application IC card which processes two or more applications using an Application Abstract Machine architecture. The AAM architecture only allows one application to be executed at a time and allows for shared processing by performing a delegation function to a second application. A data space for each application is allocated when the application is selected to be executed. The data space includes a volatile and non-volatile region. The delegation function temporarily interrupts the execution of the first application, saves the temporary data of the first application, shares any data needed with the second application and the second application is executed until the delegated task is competed. The first application then retrieves the saved data and completes its execution. A delegator stack is used to keep track of the delegator's identity when multiple delegations occur. The AAM model allows for a high level of security while transferring data between applications.

63 Claims, 7 Drawing Sheets

U.S. PATENT DOCUMENTS

| | | |
|---|---|---|
| 4,442,345 | 4/1984 | Mollier et al. . |
| 4,453,074 | 6/1984 | Weinstein . |
| 4,467,139 | 8/1984 | Mollier . |
| 4,498,000 | 2/1985 | Decavele et al. . |
| 4,536,647 | 8/1985 | Atalla et al. . |
| 4,578,530 | 3/1986 | Zeidler . |
| 4,605,820 | 8/1986 | Campbell, Jr. . |
| 4,629,872 | 12/1986 | Hällberg . |
| 4,630,201 | 12/1986 | White . |
| 4,650,978 | 3/1987 | Hudson et al. . |
| 4,669,596 | 6/1987 | Capers et al. . |
| 4,705,211 | 11/1987 | Honda et al. . |
| 4,709,136 | 11/1987 | Watanabe . |
| 4,709,137 | 11/1987 | Yoshida . |
| 4,727,243 | 2/1988 | Savar . |
| 4,727,244 | 2/1988 | Nakano et al. . |
| 4,731,842 | 3/1988 | Smith . |
| 4,734,568 | 3/1988 | Watanabe . |
| 4,736,094 | 4/1988 | Yoshida . |
| 4,742,215 | 5/1988 | Daughters et al. . |
| 4,745,267 | 5/1988 | Davis et al. . |
| 4,746,788 | 5/1988 | Kawana . |
| 4,748,557 | 5/1988 | Tamada et al. . |
| 4,748,668 | 5/1988 | Shamir et al. . |
| 4,752,677 | 6/1988 | Nakano et al. . |
| 4,757,185 | 7/1988 | Onishi . |
| 4,757,543 | 7/1988 | Tamada et al. . |
| 4,759,063 | 7/1988 | Chaum . |
| 4,759,064 | 7/1988 | Chaum . |
| 4,767,920 | 8/1988 | Kitta et al. . |
| 4,778,983 | 10/1988 | Ushikubo . |
| 4,785,166 | 11/1988 | Kushima . |
| 4,786,790 | 11/1988 | Kruse et al. . |
| 4,797,542 | 1/1989 | Hara . |
| 4,797,920 | 1/1989 | Stein . |
| 4,798,941 | 1/1989 | Watanabe . |
| 4,802,218 | 1/1989 | Wright et al. . |
| 4,803,347 | 2/1989 | Sugahara et al. . |
| 4,811,393 | 3/1989 | Hazard . |
| 4,816,653 | 3/1989 | Anderl et al. . |
| 4,816,654 | 3/1989 | Anderl et al. . |
| 4,825,052 | 4/1989 | Chemin et al. . |
| 4,831,245 | 5/1989 | Ogasawara . |
| 4,833,595 | 5/1989 | Iijima . |
| 4,837,422 * | 6/1989 | Dethloff et al. ..................... 235/380 |
| 4,839,504 | 6/1989 | Nakano . |
| 4,839,792 | 6/1989 | Iijima . |
| 4,849,614 | 7/1989 | Watanabe et al. . |
| 4,853,522 | 8/1989 | Ogasawara . |
| 4,853,961 | 8/1989 | Pastor . |
| 4,874,935 | 10/1989 | Younger . |
| 4,877,945 | 10/1989 | Fujisaki . |
| 4,877,947 | 10/1989 | Mori . |
| 4,879,747 | 11/1989 | Leighton et al. . |
| 4,882,474 | 11/1989 | Anderl et al. . |
| 4,887,234 | 12/1989 | Iijima . |
| 4,891,503 | 1/1990 | Jewell . |
| 4,891,506 | 1/1990 | Yoshimatsu . |
| 4,900,904 | 2/1990 | Wright et al. . |
| 4,901,276 | 2/1990 | Iijima . |
| 4,906,828 | 3/1990 | Halpern . |
| 4,907,270 | 3/1990 | Hazard . |
| 4,926,480 | 5/1990 | Chaum . |
| 4,935,962 | 6/1990 | Austin . |
| 4,949,257 | 8/1990 | Orbach ................................ 364/401 |
| 4,961,142 | 10/1990 | Elliott et al. . |
| 4,969,188 | 11/1990 | Schöbi . |
| 4,977,595 | 12/1990 | Ohta et al. . |
| 4,984,270 | 1/1991 | LaBounty . |
| 4,985,615 | 1/1991 | Iijima . |
| 4,987,593 | 1/1991 | Chaum . |
| 4,993,068 | 2/1991 | Piosenka et al. . |
| 4,995,081 | 2/1991 | Leighton et al. . |
| 4,996,711 | 2/1991 | Chaum . |
| 5,001,753 | 3/1991 | Davio et al. . |
| 5,003,594 | 3/1991 | Shinagawa . |
| 5,005,200 | 4/1991 | Fischer . |
| 5,010,239 | 4/1991 | Mita . |
| 5,012,074 | 4/1991 | Masada . |
| 5,012,076 | 4/1991 | Yoshida . |
| 5,014,312 | 5/1991 | Lisimaque et al. . |
| 5,016,274 | 5/1991 | Micali et al. . |
| 5,038,025 | 8/1991 | Kodera . |
| 5,068,894 | 11/1991 | Hoppe . |
| 5,093,862 | 3/1992 | Scwartz . |
| 5,097,115 | 3/1992 | Ogasawara et al. . |
| 5,120,939 | 6/1992 | Claus et al. . |
| 5,128,997 | 7/1992 | Pailles et al. . |
| 5,131,038 | 7/1992 | Puhl et al. . |
| 5,142,578 | 8/1992 | Matyas et al. . |
| 5,146,499 | 9/1992 | Geffrotin . |
| 5,148,481 | 9/1992 | Abraham et al. . |
| 5,161,231 | 11/1992 | Iijima . |
| 5,162,989 | 11/1992 | Matsuda ............................... 364/401 |
| 5,163,098 | 11/1992 | Dahbura . |
| 5,164,988 | 11/1992 | Matyas et al. . |
| 5,165,043 | 11/1992 | Miyahara et al. . |
| 5,166,503 | 11/1992 | Mizuta . |
| 5,175,416 | 12/1992 | Mansvelt et al. . |
| 5,180,901 | 1/1993 | Hiramatsu . |
| 5,191,193 | 3/1993 | Le Roux . |
| 5,191,608 | 3/1993 | Geronimi . |
| 5,200,999 | 4/1993 | Matyas et al. . |
| 5,201,000 | 4/1993 | Matyas et al. . |
| 5,202,922 | 4/1993 | Iijima . |
| 5,214,702 | 5/1993 | Fischer . |
| 5,224,162 | 6/1993 | Okamoto et al. . |
| 5,243,175 | 9/1993 | Kato . |
| 5,247,578 | 9/1993 | Pailles et al. . |
| 5,293,577 | 3/1994 | Hueske et al. . |
| 5,371,797 | 12/1994 | Bocinsky, Jr. . |
| 5,420,405 | 5/1995 | Chasek . |
| 5,452,431 | 9/1995 | Bournas . |
| 5,473,690 | 12/1995 | Grimonprez et al. . |
| 5,485,520 | 1/1996 | Chaum et al. . |
| 5,511,121 | 4/1996 | Yacobi . |
| 5,517,011 | 5/1996 | Vandenengel . |
| 5,530,232 | 6/1996 | Taylor . |
| 5,534,857 | 7/1996 | Laing et al. . |
| 5,539,825 | 7/1996 | Akiyama et al. . |
| 5,542,081 | 7/1996 | Geronimi . |
| 5,544,246 | 8/1996 | Mandelbaum et al. . |
| 5,546,523 | 8/1996 | Gatto . |
| 5,557,516 | 9/1996 | Hogan . |
| 5,557,742 * | 9/1996 | Smaha et al. ........................ 395/186 |
| 5,574,269 | 11/1996 | Mori et al. . |
| 5,578,808 | 11/1996 | Taylor . |
| 5,581,708 | 12/1996 | Iijima . |
| 5,588,146 | 12/1996 | Leroux . |
| 5,600,818 * | 2/1997 | Weikmann ............................ 711/163 |
| 5,649,118 * | 7/1997 | Carlisle et al. ........................ 705/41 |
| 5,682,027 | 10/1997 | Bertina et al. . |
| 5,692,132 | 11/1997 | Hogan . |
| 5,699,528 | 12/1997 | Hogan . |
| 5,704,046 | 12/1997 | Hogan . |
| 5,705,798 | 1/1998 | Tarbox . |
| 5,708,780 | 1/1998 | Levergood et al. . |
| 5,715,314 | 2/1998 | Payne et al. . |
| 5,724,424 | 3/1998 | Gifford . |
| 5,729,717 * | 3/1998 | Tamada et al. ...................... 711/164 |
| 5,796,831 | 8/1998 | Paradinas et al. . |

| | | | | | | |
|---|---|---|---|---|---|---|
| 5,802,519 | * | 9/1998 | Jong ........................... 707/100 | 0751460 | 1/1997 | (EP) . |
| 5,825,875 | | 10/1998 | Ugon . | 2536928 | 6/1984 | (FR) . |

FOREIGN PATENT DOCUMENTS

| | | | | | |
|---|---|---|---|---|---|
| 0275510 | 7/1988 | (EP) . | 2667171 | of 1992 | (FR) . |
| 0292248 | 11/1988 | (EP) . | 2687816 | 8/1993 | (FR) . |
| 0325506 | 1/1989 | (EP) . | 2284689 | 6/1995 | (GB) . |
| 0328289 | 8/1989 | (EP) . | 6481084 | 3/1989 | (JP) . |
| 0354793 | 2/1990 | (EP) . | 2592856 | 12/1996 | (JP) . |
| 0451936 | 10/1991 | (EP) . | 8707062 | 11/1987 | (WO) . |
| 0466969 | 1/1992 | (EP) . | 8809019 | 11/1988 | (WO) . |
| 0475837 | 3/1992 | (EP) . | WO 9005960 | 5/1990 | (WO) . |
| 0547741 | 9/1992 | (EP) . | WO 9116691 | 10/1991 | (WO) . |
| 0537756 | 4/1993 | (EP) . | 9213322 | 8/1992 | (WO) . |
| 0540095 | 5/1993 | (EP) . | WO 9320538 | 10/1993 | (WO) . |
| 0559205 | 8/1993 | (EP) . | WO 9321612 | 10/1993 | (WO) . |
| 0588339 | 3/1994 | (EP) . | WO 9522810 | 8/1995 | (WO) . |
| 0594493 | 4/1994 | (EP) . | 9619771 | 6/1996 | (WO) . |
| 0686947 | of 1995 | (EP) . | 9628795 | 9/1996 | (WO) . |
| 0636998 | 2/1995 | (EP) . | 9638825 | 12/1996 | (WO) . |
| 0647902 | 4/1995 | (EP) . | 9843212 | 10/1998 | (WO) . |
| 0666550 | 8/1995 | (EP) . | WO 9101538 | 2/1999 | (WO) . |
| 0707290 | 9/1995 | (EP) . | 9910824 | 3/1999 | (WO) . |
| | | | 9916031 | 4/1999 | (WO) . |

* cited by examiner

MULTI-APPLICATION IC CARD WITH DELEGATION FEATURE

PRIORITY APPLICATIONS

This application claims priority to U.S. Provisional application 60/046,514 filed on May 15, 1997, entitled "Design for a Multi Application Smart Card" and U.S. Provisional application 60/046,543 filed on May 15, 1997, entitled "Virtual Machine for a Multi Application Smart Card".

BACKGROUND OF INVENTION

Integrated circuit ("IC") cards are becoming increasingly used for many different purposes in the world today. An IC card (also called smart card) typically is the size of a conventional credit card which contains a computer chip including a microprocessor, read-only-memory (ROM), electrically erasable programmable read-only-memory (EEPROM), a random access memory (RAM), an Input/Output (I/O) mechanism and other circuitry to support the microprocessor in its operations. An IC card may contain a single application or may contain multiple independent applications in its memory. MULTOS® is a multiple application operating system which runs on IC cards, among other platforms, and allows multiple applications to be executed on the card itself. The multiple application operating system present on the IC card allows a card user to run many programs stored in the card (for example, credit/debit, electronic money/purse and/or loyalty applications) irrespective of the type of terminal (i.e., ATM, telephone and/or POS) in which the card is inserted for use.

A conventional single application IC card, such as a telephone card or an electronic cash card, is loaded with a single application card and only executes that one application when inserted into a terminal. For example, a telephone card could only be used to charge a telephone call and could not be used as a credit/debit card. If a card user desires a variety of application functions to be performed by single application IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal during the transaction, making the transaction difficult, lengthy and inconvenient.

Therefore, it is beneficial to store multiple applications on the same IC card. For example, a card user may have both a purse application and a credit/debit application on the same card so that the user could select which type of payment (by electronic cash or credit card) to use to make a purchase. Multiple applications could be provided to an IC card if sufficient memory exists and an operating system capable of supporting multiple applications is present on the card.

The increased flexibility and power of storing multiple applications on a single card create new challenges to be overcome concerning the integrity and security of the information (including application code and associated data) exchanged between the individual card and the application provider as well as within the entire system when communicating information between applications.

For instance, the existence of multiple applications on the same card allows for the exchange of data between two applications, while one of the applications is being executed. As stated above, a frequent flyer loyalty program may need to be accessed during the execution of an electronic purse application. If data is passed between applications in an insecure manner, it may be possible for a third party monitoring the transaction to determine the contents of the transferred data or even other private data associated with one or both of the applications. Thus, it would be beneficial to provide an application architecture and memory organization which protects an application's data from being discovered by a third party when it is exchanged with other applications present on the IC card.

Accordingly, it is an object of the invention to provide an application architecture and memory organization which provides for a secure data interaction between applications and allows multiple applications to be accessed while performing a desired task or function.

SUMMARY OF THE INVENTION

The present invention provides for a multiple application architecture for an IC card called an application abstract machine (AAM) and a method for implementing that architecture. The processing of multiple applications is accomplished by generating for at least one application (the "first application") a data memory space including at least two segments, a volatile memory segment and a non-volatile memory segment, commencing the execution of the first application's instructions; delegating or switching execution from the first application to the delegated application and in so doing, saving any data generated by the first application in the logical data memory space associated with the first application; executing the second application's instructions; retrieving the saved data and completing with this data the execution of the first application's instructions.

Additional delegation commands can be issued by the second application or other subsequent applications. The command delegated is interpreted by a delegated application in the same manner as a selection command being issued directly by a terminal and therefore each application performs the security functions at the same level as if a terminal is issuing the command.

The volatile memory segment can further be separated into public ("Public") and dynamic ("Dynamic") portions. Data can be exchanged between a plurality of applications and/or a terminal when stored in the Public region of the data memory. The Dynamic memory region can be used solely as temporary work space for the specific application being executed.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
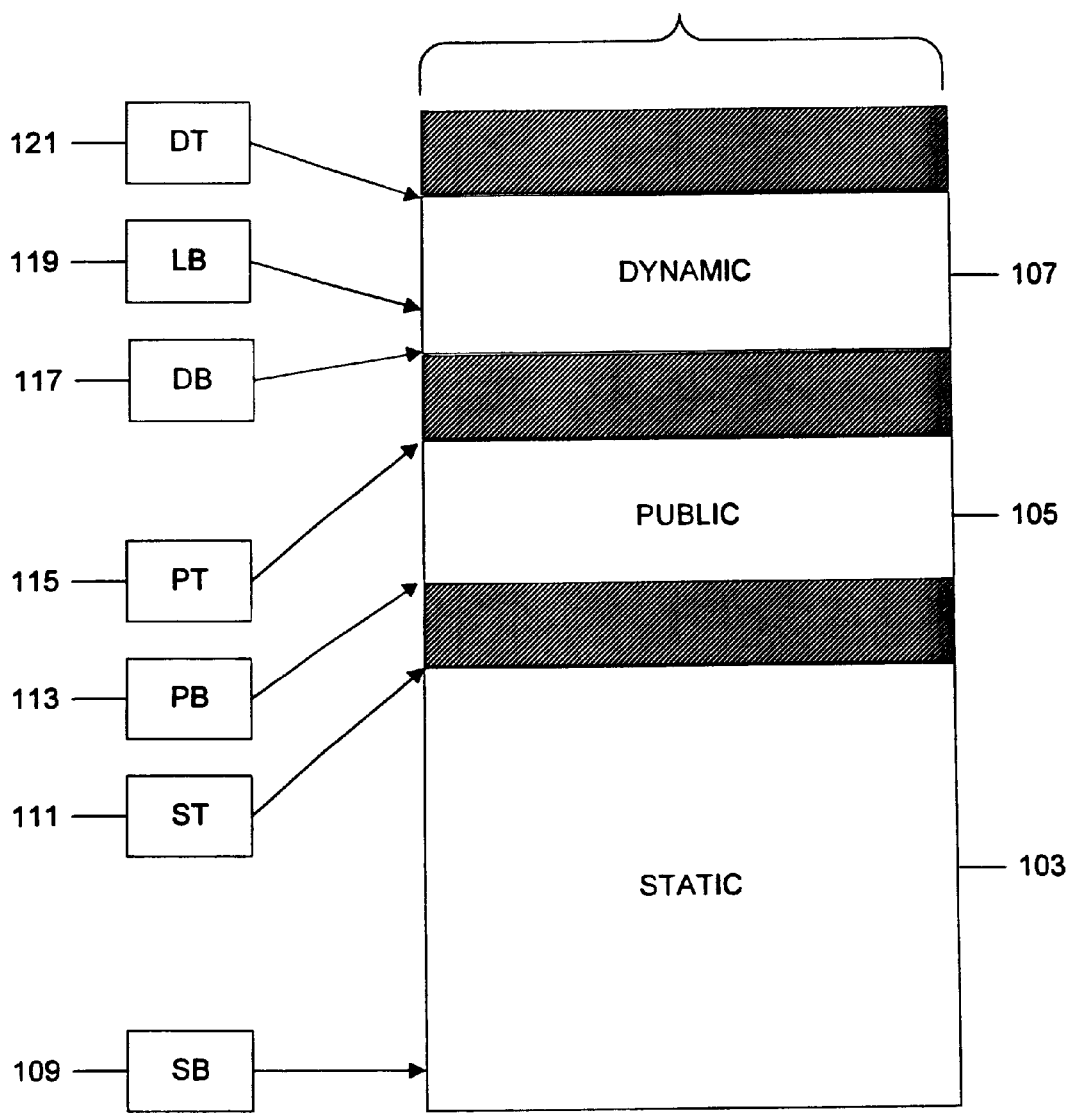
FIG. 1 is block diagram illustrating the data memory space segment and associated registers for an IC card application using the AAM organization.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

The present invention provides for a method and apparatus for processing multiple application programs with associated data stored on an IC card which can be accessed and executed. An application stored on the card can be selected by a terminal, or other interface device, or another application. Each application program which is stored on the IC card when executed is allocated a memory space organized by the program's software code (instructions which are executed by a processor located on the IC card) and the associated data which the application stores and uses during execution of the program.

For example, a multi-application card may store a purse application, or an electronic money application, and a specific loyalty application such as a frequent flyer awards application. Each application has software code and associated data to support the execution of that software code. Each application is allocated a memory space when executed. In this example, there is interaction between the two applications stored on the card. For each dollar electronically spent to make a purchase, the user may be entitled to one frequent flyer mile which is stored and processed by the frequent flyer program. The purse application need not be aware of the specific loyalty program stored on the card, but instead may contain an instruction to communicate with any loyalty program stored on the card. The loyalty program will require input data representative of the amount of a particular electronic value so that it can update its own stored data of current frequent flyer miles for the user of the card.

When two applications need to communicate during the same transaction, a system architecture is required to process both applications in an efficient and secure manner. One approach could be a windows type model where both applications could be running at the same time. Presently, however, IC card platforms are not powerful enough to simultaneously operate multiple programs efficiently. Also, transferred data may be exposed to unwanted third party access. The solution to this problem, provided by the current invention, which is described in greater detail below, is to selectively interrupt the execution of applications in a secure manner. This allows the integrity of the applications' data to be maintained and allows the best utilization of the available memory space in the IC card.

An efficient architecture for processing multi applications in an IC card is termed an Application Abstract Machine (AAM) architecture and is described herein. The AAM Architecture applies to any platform independent of its hardware and enables developers to write applications to store on the IC cards which are portable across many different types of platforms (e.g., IC cards built by different manufacturers with different processor configurations) without the need for knowledge about the specific hardware of the platform.

An application abstract machine (AAM), a term for the memory allocation and organization for the data stored and used by each application, is created for each application stored on the IC card which is executed by the processor on the card. In order to ensure data integrity and security when data is transferred between applications which are executed on the IC card, only one application on the IC card is allowed to be executed at a time. Each application has a data memory space which is virtually allocated and mapped onto the physical memory addresses available in the IC card memories. Data is then passed between two or more applications within a specified memory location and in a manner consistent with transferring data to an external terminal or device with which the IC card is securely interacting. At a general level, each AAM space created for each application being executed includes two separate address spaces, one for the program code itself and one for the program data which is stored and/or used by the application. The program data address space is effectively divided into three segments: a Static segment, a Dynamic segment and a Public segment which are described in more detail in conjunction with FIG. 1. As stated above, the Static, Dynamic and Public segments are logically mapped to the physical memory; they are virtual memory segments as opposed to physical memory segments. The AAM data address space is preferably addressed and processed using seven different address registers and two control registers.

FIG. 1 shows an illustrative diagram of a logical data space allocation 101 created for an application used in conjunction with the present invention. The AAM data portion 101 includes a Static data space 103, a Public data space 105 and a Dynamic data space 107. Also shown are a series of address registers: the Static base address register 109, the Static top address register 111, the Public base address register 113, the Public top address register 115, the Dynamic base address register 117, the Dynamic top address register 121 and local base address register 119 which serves as a local stack frame pointer in the Dynamic data space when the application is being executed. The address registers can contain physical memory addresses but preferably contain offset addresses for the various data address spaces in order to be hardware independent. An example of the overall address space is 64K bytes, although the size varies with the applicable platform and the available memory size. The registers can also be considered pointers or can be any other conventional addressing mechanism.

Within the allocated AAM data space 101, the Static portion of the memory is non-volatile which is not erased after power is removed from the IC card (such as EEPROM), the Dynamic space is volatile (such as RAM) which may be erased after power is removed from the card and the Public space is also volatile (such as RAM). An IC card can receive power from a terminal after it is interfaced into the terminal. Although an IC card may contain a battery to maintain some power for memory and circuitry, volatile memory will typically be erased after the IC card is removed from its power source.

The defined AAM data space has bytes in each segment which are contiguous, so that applications can perform pointer and offset arithmetic. For example, if the segment addresses "1515" and "1516," or any other pair of sequential numbers, are both valid and are present within the same segment, then they address adjacent bytes. This allows offset values stored in registers to determine the location of a desired memory address. The segment address of the first byte of the Static segment is zero, so that the segment address of a given location within the Static region is equal to its offset.

Pointers to other specific regions of the Static data area can be stored in the Static data because the Static region is non-volatile. For example, if the card user's name is stored in the Static memory of a credit/debit application, the application will know the card user's name will always be stored in the $5^{th}$ memory location above the starting point for the Static portion of memory. The location can be noted as SB[5] or the $5^{th}$ byte above the Static Bottom. Since the Static memory is non-volatile, it will not be erased after each transaction and the application will always know of its location relative to the Static segments' address registers.

On the other hand, the segment address of any location in the Dynamic or Public segments is not always equal to a particular offset from the beginning of the respective segment because the contents of those segments change for each operation. The fourth location in the Dynamic segment will be different for each operation performed by the application. The address of a memory location of Dynamic or Public segment is fixed preferably only for the duration of one command-response pair operation. Because segment addresses in Dynamic or Public are not fixed, MULTOS Executable Language (MEL)™ instructions (or any other program instructions) cannot refer to data using only segment addresses. Instead, a tagged address preferably is used to identify data which is to be retrieved, manipulated, transferred and/or stored with the IC card system.

A tagged address is a nineteen bit value consisting of a three bit tag (address register number) and a sixteen bit offset. Each of the seven address registers for the AAM data space contain a segment physical address. For instance, the address registers SB 109 and ST 111 point to the boundaries of the Static, the address registers PB 113 and PT 115 point to the boundaries of the Public and the address registers DB 117 and DT 121 point to the boundaries of the Dynamic. For each segment, the top register points to the byte immediately after the last valid byte. For example, the last valid byte of the Static is ST[−1]. Register LB functions as a stack frame pointer. It points to a location in the Dynamic segment to indicate a specific byte of local data for the currently executing application.

Referring to FIG. 1, the allocated Static segment 103 contains the application's non-volatile data. Static data includes data which is associated with each application for every transaction such as the card user's name, account number, PIN value and address. Static data also includes variable data which is stored for use in future transactions using the application. For example, in a purse transaction, the electronic value data would be read from the Static segment and later saved in the Static segment at the end of the transaction. Additionally, transaction information data or available credit limits in the case of a credit/debit application would be stored in Static data.

The Static data is addressed using register SB (Static Base) and the register ST (Static Top) as offset registers. These registers contain the offset value from a physical address in a memory on the IC card. The individual memory location is then further offset from these starting points such as SB[3] or ST[−5]. SB is defined as zero and ST is equal to the size of the application's Static data which is set when the application is loaded onto the IC card. The multiple application operating system ensures that no other application can read or write the data stored in the Static segment of a particular application. Using current technology, the Static segment is preferably mapped onto an EEPROM (Electrically Erasable Programmable Read-Only Memory) which is non-volatile.

The Dynamic segment 107 contains the application's volatile or temporary data. Dynamic data includes data which is temporarily used during the execution of an application such as intermediate values used in calculations or working variables. For example, a purse application may temporarily store the value of a transaction in order to reduce the amount of the value in the purse. The temporary data is used much like conventional computer programs use RAM to perform their assigned operations. The Dynamic segment preferably is divided into two parts, the session data portion and the stack data portion. The size of the session data is a constant for each application and is determined when the application is loaded. The stack holds variable data which is unique to the particular transaction being executed. The stack data portion stores data in a last-in-first-out manner. The stack is initially empty, but expands and contracts during execution of the application.

The Dynamic data is addressed from the register DB 117 to register DT 121. Register LB 119 serves as a local stack frame pointer to particular memory locations in the Dynamic segment for delegate commands or function calls. Register LB 119 is used to address the topmost frame, that of the currently executing function's session data. Register DT 121 serves as an address offset for the stack pointer. A one byte data item at the top of the stack is addressed as DT[−1], the next byte below is addressed by DT[−2], and so on. A push operation increments the relative value of DT for each item on the stack and a pop operation decrements the relative value of DT for each item on the stack. For example, a data element located at DT[−5] will be located at DT[−6] after an additional data item is placed on the stack.

When an application is being executed, the Dynamic segment created for that application also contains the application's session data which is used in performing the assigned task(s) or operation(s). The multiple application operating system ensures that no other application can read or write the data stored in the Dynamic segment of a particular application. The session data is set to zero upon the start of the execution of the application. Stack data will be saved in the stack if the application delegates a task or operation to another application.

A delegation function occurs when one application selects another application to process a command instead of processing the command itself. An example of a delegation function occurs when a delegator application receives a command that it does not recognize or is not programmed to process. The selected application should not reject the command and provide an error response to the interface device (IFD), but instead should pass the command to the appropriate receiver, or delegated application. In order to perform a delegation, the delegator calls the Delegate primitive. The Delegate primitive is a subroutine recognized by the multiple application operating system which is executed when the operating system interprets the Delegate instruction. Primitives can be stored as part of the operating system itself, loaded as a separate routine when the operating system is installed. Primitives are preferably written in machine executable language so that they can be executed quickly although they could be written in a higher level language. When a Delegate command is executed, execution of the delegating application is suspended, and the delegated application is executed instead. The delegated application then generates its own data memory space according to the AAM architecture. The data stored in the Public memory space of the first application (stored in RAM) is sent to the Public memory space of the second application (which could be physically the same memory but is allocated separately for each application) so that data can be passed between the applications. The Dynamic memory space is also shared although data is saved in a stack for the delegator and the other portions initialized before the delegated application is executed because the Dynamic data is secret.

In most cases, the delegated application processes the command exactly as though the command has arrived directly from an interface device. When the delegated application has finished processing the command, and has written a response into the allocated Public memory segment, it exits as normal. The delegator then resumes execution at the instruction address following the executed instruction which called the Delegate primitive. The response generated by the delegated application is retrieved or accessed from the allocated Public memory space. The delegator application may simply exit in turn, thus sending the response to the IFD, or may carry out further processing before exiting.

Another example of a delegation operation occurs when two applications need to share data. If an application A always returns a data item N when processing a command B, then another application which also returns data item N in response to a command can delegate the function B to application A in order to reduce the need for duplicate codes stored on the IC card. For example, if a PIN needs to be checked before an application is executed, an application stored on the card can delegate the "retrieve PIN function" to a PIN application which returns a stored universal PIN for the card.

Preferably, a new session begins whenever the IFD, e.g. a terminal, successfully selects an application, even if the application has been previously selected during the transaction. For example, if a card user goes to a terminal and transfers twenty dollars of electronic cash using a purse application, charges thirty dollars using a credit/debit application and then transfers ten dollars using the purse application again, three separate sessions will have occurred even though only two applications were used during the entire transaction. Each time an application delegates a task or function to another application, the delegated application treats the delegate function as if the IFD devices had selected the application to perform the task or function. However, performing a delegation function as described below has a different effect on session data.

The following examples will help explain when the session data is initialized (i.e., erased) versus when it is saved to be used in further operations. If application A is selected by an IFD device, and receives commands X, Y and Z from the terminal, application A may delegate all three commands to application B. For example, delegations may occur in response to delegation commands in the program code. Both applications A and B will have their session and stack data in their respective Dynamic segments initialized (set to zero) when they receive command X, but the stack will not be initialized when they receive the subsequent commands Y and Z.

In a second example, application A is selected, and receives commands X, Y and Z from the terminal. Application A processes X itself, but delegates Y and Z to application B. Application A will have its session and stack data initialized when it receives X, but not when it receives the subsequent commands Y and Z. Application B will have its session and stack data initialized when it receives Y, but not Z.

One example of a use of session data is to support the use of a session Personal Identification Number (PIN). The application could reserve one byte of session data to support the PIN-receiving flag. On receiving the PIN check command, the selected delegated application could update the flag as follows: if the PIN command is received and the inputted PIN is equal to the stored pin, then it will set the session data DB[0] to 1. If not, the application will check if the PIN flag is already set by checking the value in DB[0]. In either of the above cases, the application will process the rest of the commands in the session because the PIN has been verified. If neither of the cases is true, then the application will not process the command because the PIN is not proper. The PIN checking function could be a delegated function from the selected application to a PIN checking application.

The Public segment 105 is used for command and response data being passed between an IFD and an application. During a delegate command, the Public segment contains the data passed between two applications, the delegator (the application initiating the delegation) and the delegated application (the application which performs the delegated function). An application may also use the Public segment as a further temporary working storage space if required. The Public data is addressed using offsets stored in register PB 113 as a starting address, to register PT 115 as an ending address. Register PB 113 and Register PT 115 are fixed for the duration of a command-response pair being initiated by the IFD or delegator. Public data can include data inputted into or supplied by a terminal such as a transaction amount, vendor identification data, terminal information, transmission format or other data required or used by an application resident on the IC card. Public data can also include data which is to be transmitted to an IFD device or other application such as an electronic dollar value, card user information transmission format or other data required or used by the terminal or other delegated application.

The multiple application operating system ensures that the data stored in the Public segment remains private to the application until the application exits or delegates. Preferably, the data in the Public segment is then made available to other entities as follows: (1) if the application delegates, the whole of the Public segment becomes available to the delegated application; (2) if the application exits, and is itself delegated by another, the whole of the Public segment becomes available to the delegator; or (3) if the application exits, and is not itself delegated, then a portion of the Public segment containing the I/O response parameters and data are made available to the IFD.

An application may write secret data into the Public memory segment during execution of the application, but the application must make sure it overwrites the secret portion of the Public segment before delegating or exiting. If the application abnormally ends (abends), then the operating system on the IC card preferably overwrites all of the data in the Public segment automatically so that no unwanted entities can have access to the secret data. If the MULTOS carrier device (MCD) is reset, the operating system overwrites data in the Public segment automatically, so that no secret data is revealed. A portion of the Public memory segment is also used as a communications buffer. The I/O protocol data and parameters are preferably stored at the top of the Public memory space. In another preferred embodiment, the top seventeen bytes are reserved for the communications protocol between the IFD device and the IC card application. However, additional or less bytes can also be used depending upon the particular application and operating system being utilized.

The spaces shown between the memory segments in FIG. 1 will vary depending upon the specific application and commands being processed. There could be no memory space between the memory segments so that the memory segments are contiguous.

Figure 2:
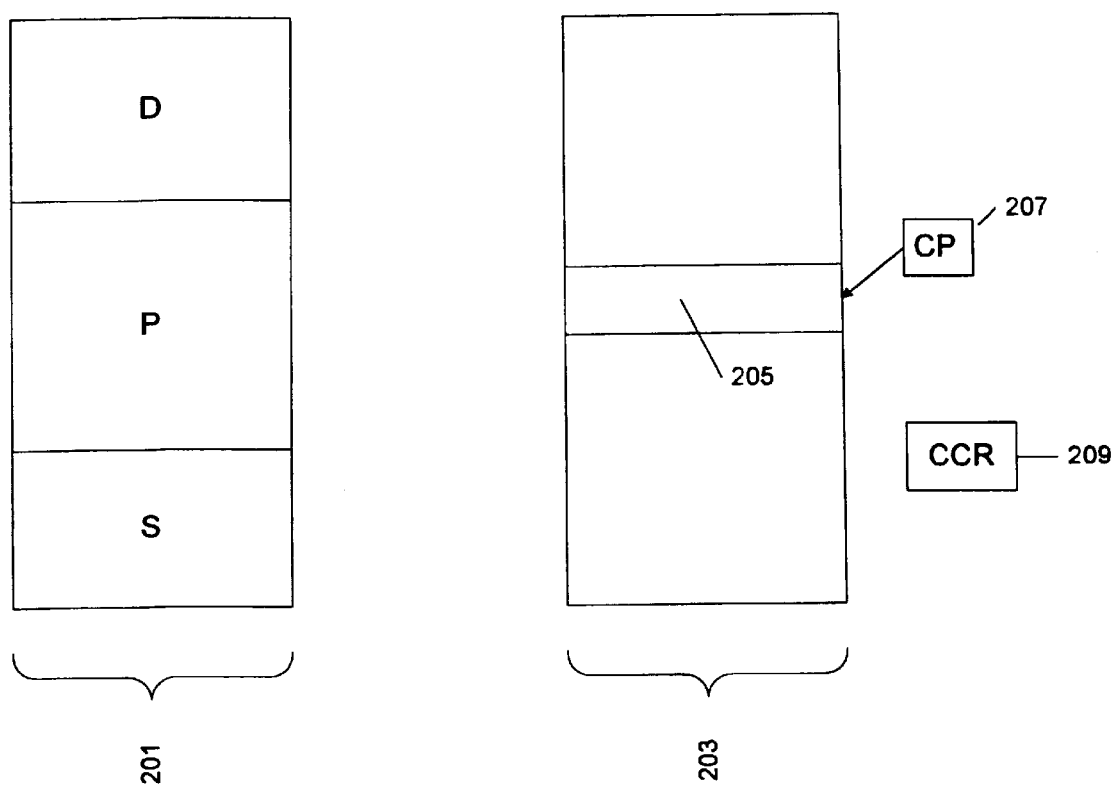
FIG. 2 is a block diagram illustrating the code memory and the data memory spaces for an IC card application using the AAM architecture.

FIG. 2 shows an extended illustration of the AAM implemented architecture. Data memory space 201 includes the three segments Static, Public and Dynamic as previously described. Code memory space 203 contains the program instructions for an application stored on the IC card. The application instructions are preferably stored in an executable form which can be interpreted by the resident operating system but can also be stored in machine executable form. Instruction 205 is stored at one location in the code memory space 203. Additional instructions are stored in other locations of memory space 203. Two additional registers 207 and 209 are used in the AAM architecture. A code pointer (CP) register 207 indicates the particular code instruction to be next executed. In the figure, the register indicates, e.g., through an offset or pointer means, that instruction 205 is the next to be executed. Condition Control Register 209 contains eight bits, four of which are for use by the individual application and four of which are set or cleared depending upon the results of the execution of an instruction. These condition codes can be used by conditional instructions such as Branch, Call or Jump. The condition codes can include a carry bit, an overflow bit, a negative bit and a zero bit.

All address and control registers are set to defined values prior to executing the selected or delegated application. The values are set either when the application is first loaded onto the card and the size of the code and non-volatile data can be ascertained or at the moment when the application passes control to the application. When the application is loaded, SB is set to zero and ST is equal to the number of bytes in the application's Static database. The other address registers are initialized when the application is given control. CP 207 is set to zero and all eight bits in CCR 209 are cleared at the start of executing the application.

A communications interface mechanism is present between the IFD and an application which includes the use of the Public data segment as a communications buffer for command-response parameters. A command-response parameter means an application is given a command to perform and returns a response to the entity issuing the command. Applications interact with an IFD by receiving commands, processing them and returning responses across the IFD-Application Interface. When an application has completed executing a command, the application will place the response into the Public segment starting at PB[0] which can be read by the IFD device and will set the proper interface parameters in the reserved Public space relative to PT[0].

While an application can be called directly from an IFD and return a response directly to an IFD, it can also delegate a request to another application where appropriate. The subsequently-called application will then process the request on behalf of the first application. The delegation can be directly in response to a received command in which the delegator acts as a controller for delegating commands or subcommands to other appropriate applications. Alternatively, the delegated command can be embedded in an application's code which delegates control of the processor when the first application needs to interact with another application during its execution, such as updating frequent flyer miles or verifying a PIN.

Figure 3:
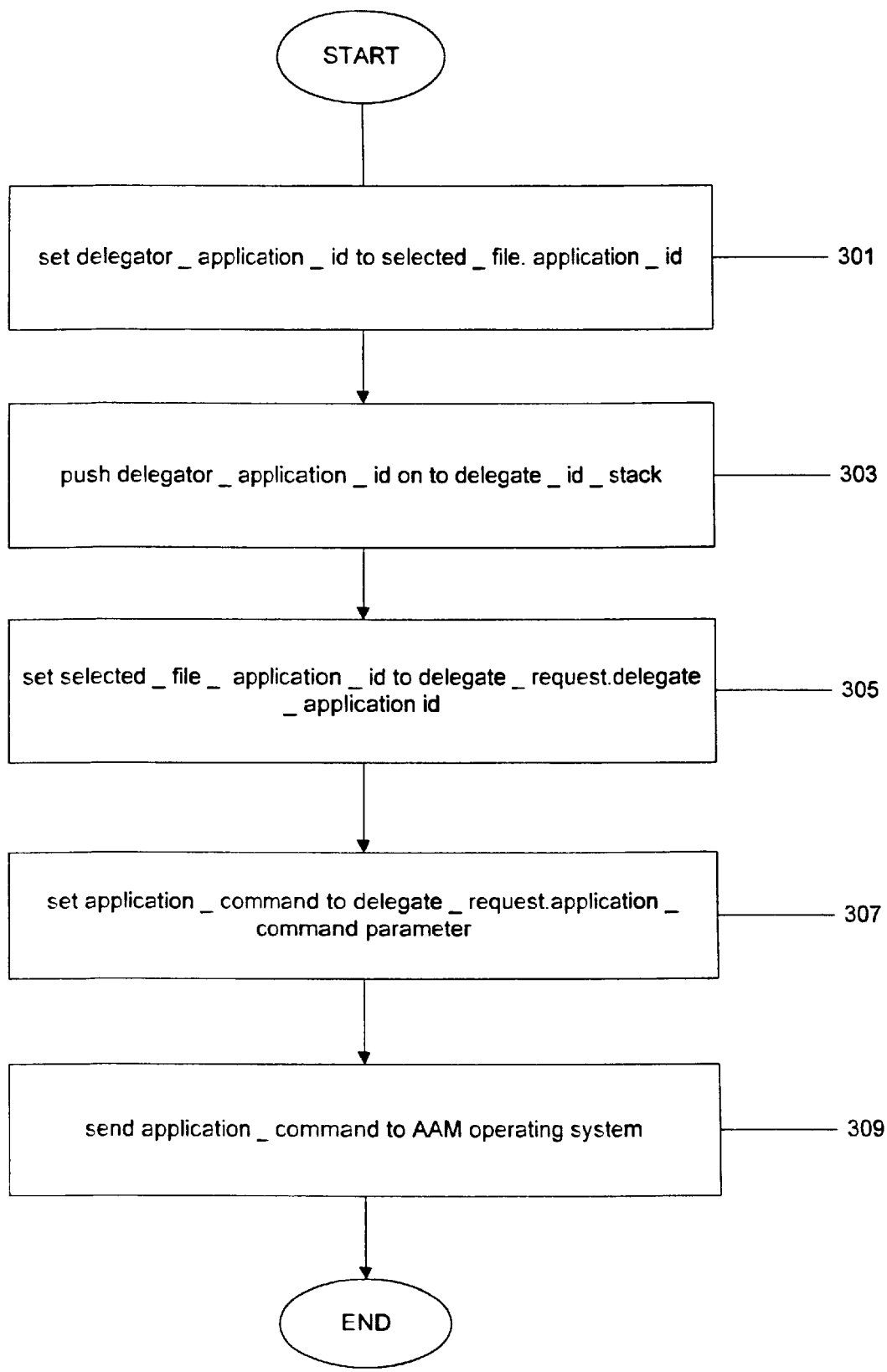
FIG. 3 is a flow diagram illustrating the steps of performing a request for a delegation fuinction by one application to another.

FIG. 3 shows a flow chart of the steps which are performed when a delegate request is executed. Step 301 sets the parameter named delegator_application_id (delegator ID) to be equal to the selected_file application$_{id}$ (selected ID). The selected ID indicates the current application which is selected and which is currently being executed. The delegator ID indicates the application which delegates a function to another delegated application stored on the IC card. Step 303 then pushes (stores) the delegator ID onto the top of the delegate_id_stack (delegate stack). The data referenced in the Dynamic portion of allocated memory is saved so that the current application can complete its execution after the delegated function is complete. Data which is to be shared with the delegated application is referenced in the Public portion of allocated memory. The delegate stack is preferably stored outside of an application's AAM memory space and keeps track of which applications have delegated functions. Each application is suspended when it delegates a function so the delegate stack can act in a Last-In-First-Out (LIFO) manner so that if a number of applications are suspended due to delegation requests, the proper application is started in the right order. The delegate stack thus keeps track of which application was the last delegator when multiple layered delegation functions are performed. The delegate stack preferably operates in a LIFO manner although different stack schemes could be used as appropriate.

Step 305 then sets the selected ID to the delegate_request.delegate_application_id (delegate ID) value. This step selects the application which will be called to perform the delegated function or functions. The identities of the delegated application can be specifically called by the delegator application or a particular function can be matched up with an application in a look up table. For example, a PIN match operation may be delegated to different applications depending upon which applications are present on the card. Step 307 then sets the application_command parameter to the value stored in the delegate_request.application_command parameter. This step specifies the command to be delegated to the delegate application. Applications typically have the ability to process many different commands. Alternatively, the entire application could be executed to perform one or more functions. The delegator application can choose which command it is delegating to another application. Step 309 then sends the application_command to the AAM operating system for execution by the delegatee application. The delegator application is then suspended (or interrupted). Any data that is required to pass between the applications is transferred via the Public memory space.

Figure 4:
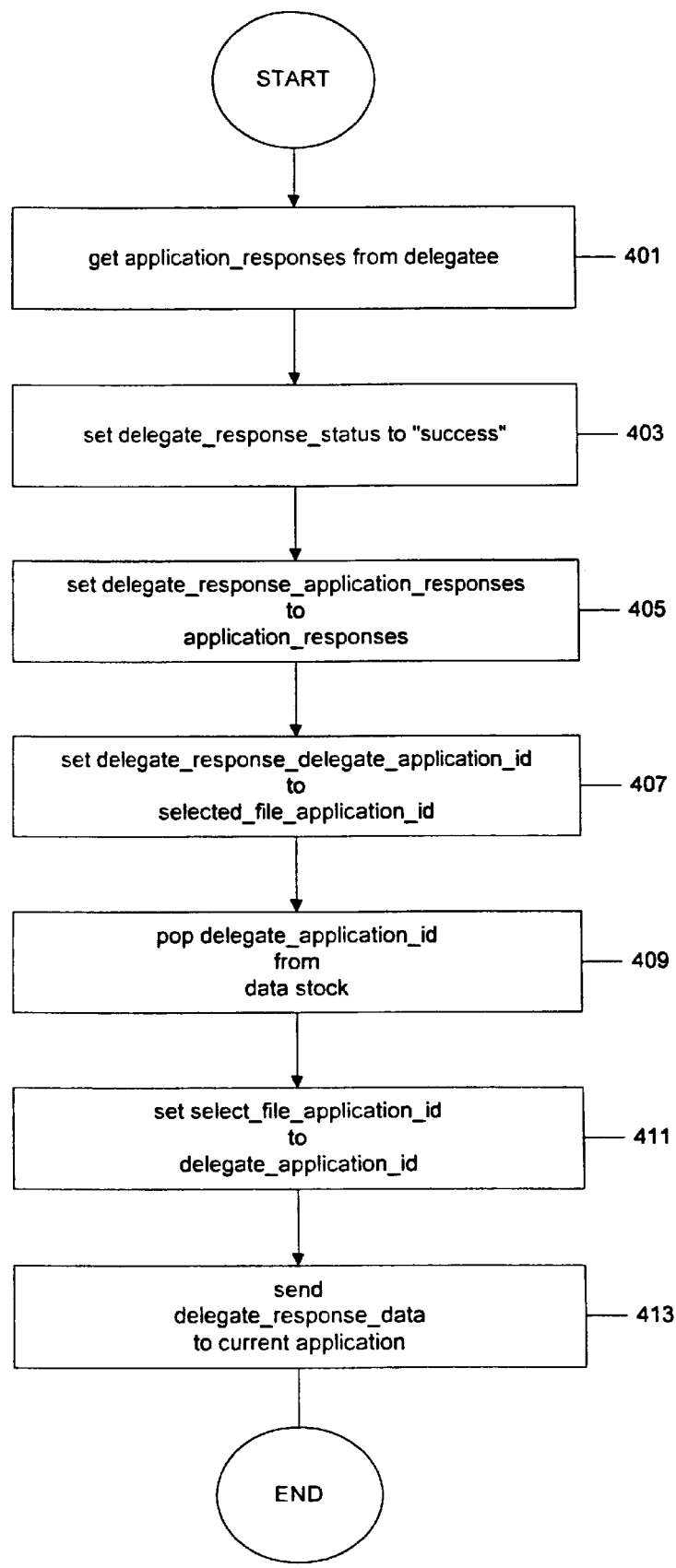
FIG. 4 is a flow diagram illustrating the steps of performing a return delegation control function for a delegate application to a delegator application.

FIG. 4 is a flow chart of the steps for performing a "return delegation control" command by the delegatee application. This command is executed by the operating system when a delegated application has completed its delegated function. Step 401 gets application_responses from the Public memory space of the delegated AAM. The response data is passed in the Public memory segment of the delegatee AAM. Step 403 then sets the delegate_response status variable to a success condition. This means that a delegation operation has been successfully completed. Step 405 sets the delegate_response.application_responses parameter to the application_responses values which were stored in the Public segment of the delegatee application.

Step 407 sets the delegate_response.delegate_application_id parameter to selected_file.application_id (the delegatee application ID). Step 409 pops the top (i.e., reads the last data stored in the stack) delegate_application_id from the delegate_id_stack. This information indicates the identity of the delegator application for the command which was just delegated and completed by the delegated application. Step 411 sets the select_file.application_id value to the delegator_application_id value. This selects the delegator application which was identified from the delegate ID stack as the current application which will resume running. The Dynamic data for the delegator application will be retrieved for the delegator application from its stored location so that the application will continue to execute where it left off with all data intact but will also have the response information from the delegated function. In step 413, the delegate_response data is sent to the current application for further processing. The response data is passed through the Public data space which could be the same physical RAM memory location because all applications share the physical volatile memory space.

Figure 5:
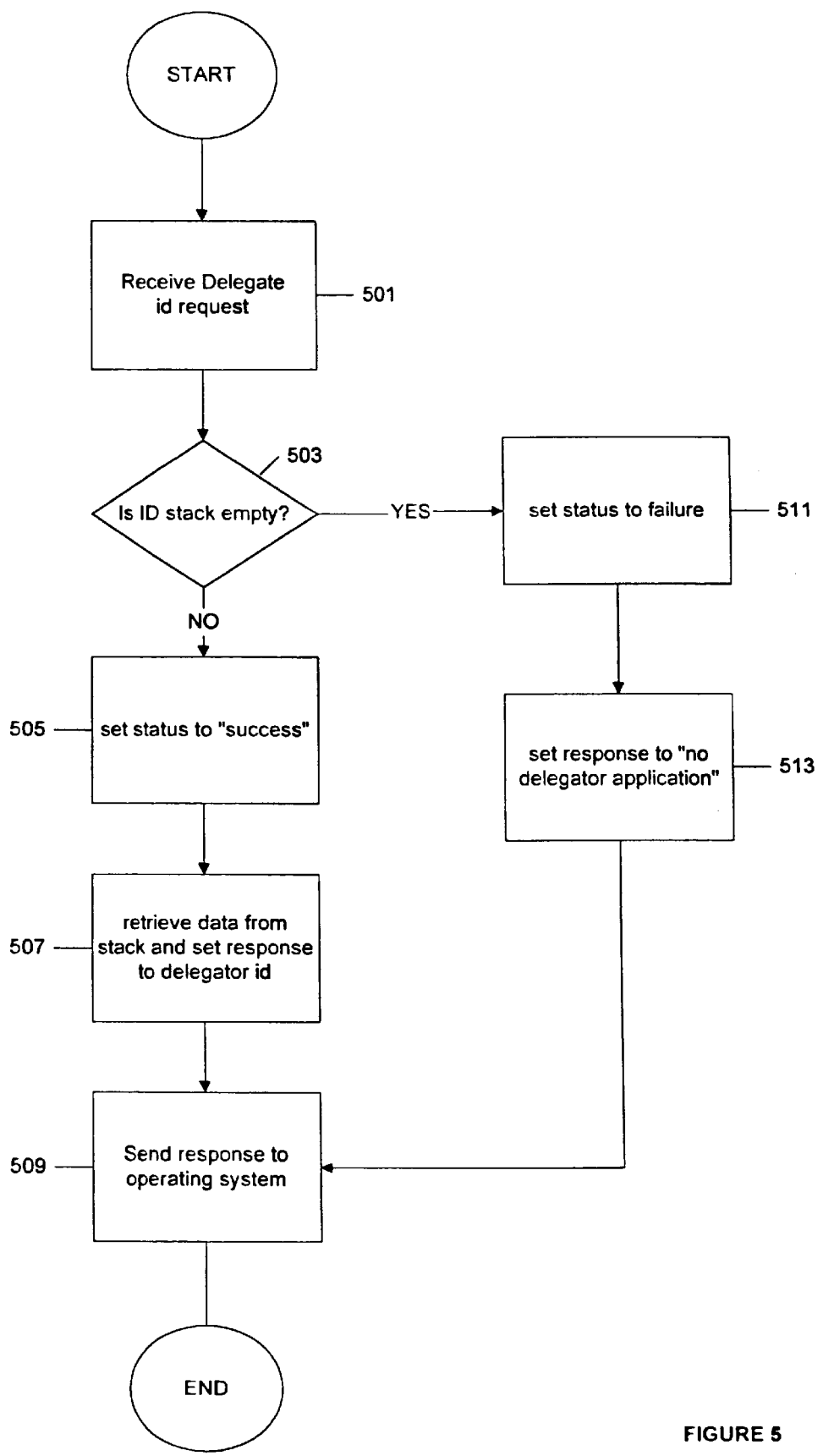
FIG. 5 is a flow diagram illustrating the steps of performing an inquire delegator ID request of a delegation function.

FIG. 5 shows a flow chart of the steps involved for inquiring about a delegator ID when a delegate command is received by a delegated application. The delegated application may need to know the identity of the delegator because it may perform operations differently for different delegator applications. For example, an airline loyalty program may need to know if awarded frequent flyers will be based on actual dollars processed or a lump sum award for some other activity such as performing a bill payment operation. This information could be passed to the delegated application as a variable or could be ascertained using an inquiry. The delegator inquiry operation could be implemented as a primitive as previously described.

Step 501 receives the delegator_id_enq_request from the AAM operating system. The request is used to identify the identity of the delegator. Step 503 checks if the delegate_id_stack is empty. If the stack is empty, then no delegation operations have occurred and no applications have been suspended. Thus step 511 sets the delegator_id_enq_response.status parameter to a failure indicator. Step 513 then sets the value of delegator_is_enq_request.error_cause to a value indicating "no delegator application." There is no delegator application. The process then continues with step 509.

If the delegate_id_stack is not empty, than one or more delegations have occurred. In that case, step 505 sets the delegator_id_enq_response.status parameter to a value indicating "success". Step 507 then sets the delegator_id_enq_response.delegator_application_id parameter to the value stored in delegate_id_stack.delegator_application_id. This sets the inquiry response to indicate the delegator application ID at the top of the stack. As explained above, the stored data at the top of the stack indicates the last delegator application to call a delegate function. Step 509 then sends the delegator_id_enq_response back to the AAM operator system which delivers the information to the application or IFD entity requesting the information.

Figure 6:
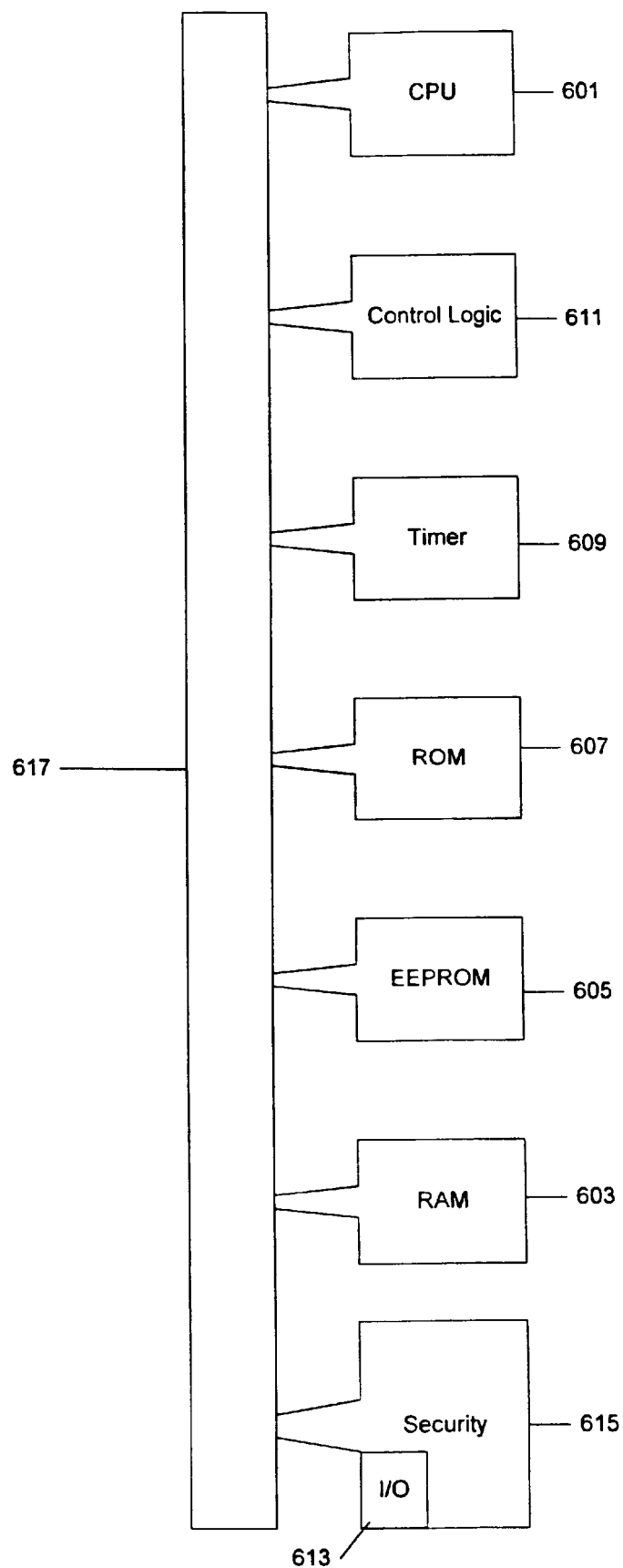
FIG. 6 is a block diagram of an IC card chip which can be used as a platform in accordance with the invention.

FIG. 6 shows an example of a block diagram of an integrated circuit located on an IC card chip which can be used in conjunction with the invention. The integrated circuit chip is located on a chip on the card. The IC chip preferably includes a central processing unit 601, a RAM 603, a EEPROM 605, a ROM 607, a timer 609, control logic 611, I/O ports 613 and security circuitry 615, which are connected together by a conventional data bus 617 or other conventional means.

Control logic 611 in the smart card provides sufficient sequencing and switching to handle read-write access to the card's memory through the input/output ports 612. CPU 601 in conjunction with control logic 611 can perform many different functions including performing calculations, accessing memory locations, modifying memory contents, and managing input/output ports. Some IC cards also include a coprocessor for handling complex computations like cryptographic algorithms. Input/output ports 613 are used for communication between the card and an IFD which transfers information to and from the card. Timer 609 (which generates and/or provides a clock pulse) drives the control logic 611, CPU 601 and other components requiring a clock signal through the sequence of steps that accomplish functions including memory access, memory reading and/or writing, processing, and data communication. Security circuitry 615 (which is optional) preferably includes fusible links that connect the input/output lines to internal circuitry as required for testing during manufacture, but which are destroyed upon completion of testing to prevent later access. The Static memory space is preferably mapped to memory locations in EEPROM 605 which is non-volatile. The Dynamic memory space is preferably mapped to RAM 603 which is volatile memory which has quick access. The Public memory space is also preferably mapped to RAM 603 which is volatile memory. The Dynamic data and Public data will be stored in different portions of RAM 603, while RAM is identified as a preferred non-volatile memory and EEPROM is identified as a preferred volatile memory. Other types of memory could also be used with the same characteristics.

Figure 7A:
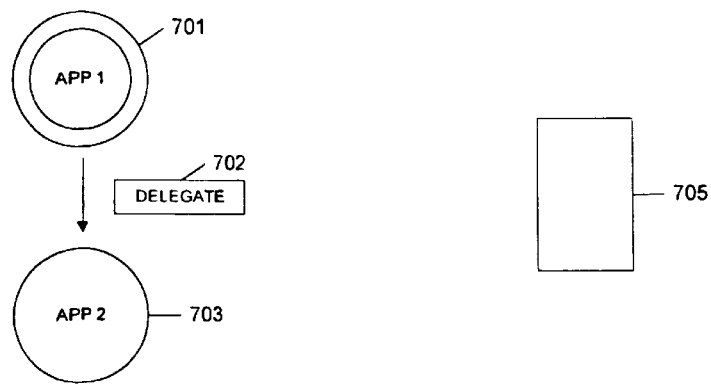
FIGS. 7A, 7B and 7C illustrate multiple delegation calls made between three applications.
Figure 7B:
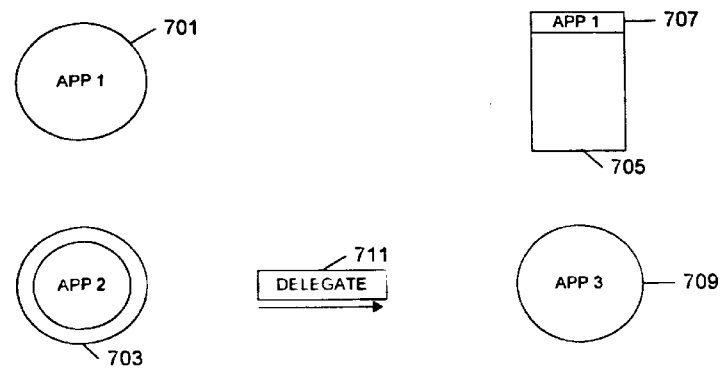
Figure 7C:
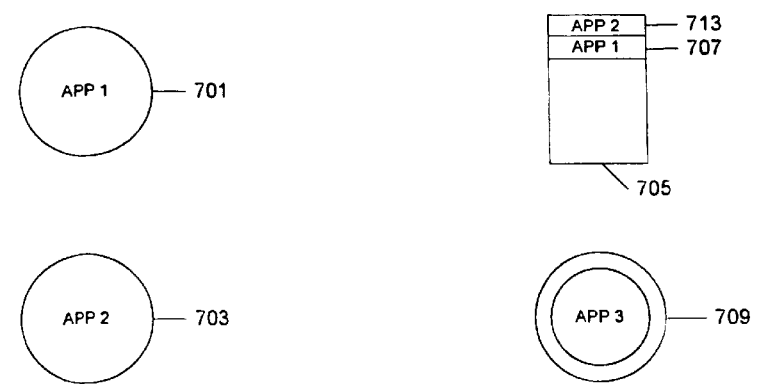

FIGS. 7A, 7B and 7C illustrate an example of a delegation function being performed in order to process multiple applications on an IC card. FIG. 7A shows a first application being executed as denoted with a double ringed circle 701. At some point during the execution of the first application, a delegation function 702 is called to delegate an operation to the second application which is indicated by circle 703. Also shown in FIG. 7A is an empty delegator ID stack 705. Since the stack is empty, there is no data associated with it and it is shown only for illustrative purposes.

The multiple application operating system receives the delegate command and interrupts the execution of the first application 701 and gives control of the integrated circuit to application 703 as shown in FIG. 7B. The execution of the second application 703 is illustrated with a double ringed circle. The term "gives control" means that the microprocessor and other circuitry on the card will process the instructions and allocate memory space for the application which is delegated. When the delegate command is processed, the delegator ID 707 is placed on top of the stack 705. The delegator ID stack is operated in a LIFO manner. Also shown in FIG. 7B is a third application 709 resident on the card. At some point during the execution of the second application, a delegate function 711 is called to delegate the operation to the third application.

The multiple application operating system receives the delegate command 711 shown in FIG. 7B interrupts the execution of the second application 703 and gives control of the integrated circuit to the third application 709 as shown in FIG. 7C. When the delegate command is processed, the delegator ID 713 of the second application is pushed onto the delegator ID stack 705. The delegator ID 707 of the first application whose execution is still interrupted is pushed down in the stack consistent with a LIFO stack management. Thus when the third application has finished its execution, the delegator ID at the top of the stack is popped to indicate that execution of the second application should be resumed first. The delegator ID 707 from the first application will then be at the top of the stack so that when the second application is finished executing, the first application will resume its execution.

Additional applications can be managed by the delegator ID stack in a similar manner. By interrupting the execution of the applications when a delegate command is processed and keeping track of the order of delegations, the security and integrity of the data for each individual application can be maintained which is important because IC cards will store data for applications which is private to the card user such as account numbers, social security number, address and other personal information.

The foregoing merely illustrates the principles of the invention. It will thus be appreciated that those skilled in the art will be able to devise numerous apparatus, systems and methods which, although not explicitly shown or described herein, embody the principles of the invention and are thus within the spirit and scope of the invention.

We claim:

1. An integrated circuit card comprising:
    a microprocessor; a volatile memory coupled to said microprocessor; a non-volatile memory coupled to said microprocessor; and a plurality of applications stored in said non-volatile memory, wherein upon execution of each said application, said microprocessor allocates for each said executing application an associated data memory space comprising at least a volatile memory segment for referencing temporary data and a non-volatile memory segment for referencing static data; and further comprising means for delegating the performance of a function from a first executing application to a second executing application.

2. The integrated circuit card of claim 1, wherein said non-volatile memory segment is divided into at least two regions, including a public region and a dynamic region.

3. The integrated circuit card of claim 2, wherein said public region is used to share data between said first and second applications.

4. The integrated circuit card of claim 2, wherein said dynamic region is used to reference temporary data utilized during an application's execution.

5. The integrated circuit card of claim 1, further comprising at least one register coupled to said microprocessor which is used to determine the starting locations of each of said segments.

6. The integrated circuit card of claim 5, further comprising at least one register coupled to said microprocessor which is used to determine the top locations of each of said segments.

7. The integrated circuit card of claim 6, further comprising at least one register coupled to said microprocessor which is used as a local dynamic pointer.

8. The integrated circuit card system of claim 1, wherein each said application comprise a plurality of program instructions and wherein at least one of said program instructions when executed causes said memory referenced by said volatile memory segment to be accessed.

9. The integrated circuit card of claim 1, wherein said volatile memory segment references RAM and said non-volatile memory segment references EEPROM.

10. A method for processing a plurality of applications stored in a memory of an integrated circuit:
    selecting a first application for execution;
    allocating a data space for said first application including at least two memory segments comprising a volatile memory segment for referencing temporary data and a non-volatile memory segment for referencing static data;
    executing said first application, interrupting execution of said first application and saving data referenced by said volatile memory segment;
    executing a second application;
    utilizing said saved data from said volatile memory segment for execution of said first application; and
    completing said execution of said first application.

11. The method of claim 10, wherein said first application's identity is stored in a data stack during said delegation step.

12. The method of claim 11, wherein said data stack is accessed following said completion of said second application.

13. The method of claim 12, further including the step of inquiring said first application's identity by accessing said delegator stack.

14. The method of claim 10, wherein said non-volatile memory segment is divided into at least two regions, including a public region and a dynamic region.

15. The method of claim 14, wherein said public region is used to share data between said first application and said second application.

16. The method of claim 14, wherein data referenced by said dynamic region is utilized during the execution of said first application.

17. The method of claim 10, further including the step of allocating a second data space including at least two memory segments for said second application.

18. The method of claim 17, wherein said second data space's segments comprise a volatile memory segment for referencing temporary data and a non-volatile memory segment for referencing static data.

19. The method of claim 18, wherein said second application's non-volatile segment is divided into at least two regions, including a public region and a dynamic region.

20. The method of claim 19, wherein said second application's public region is used to share data between said first and second applications.

21. The method of claim 19, wherein said data referenced by second application's dynamic region is utilized during said execution of said second application.

22. The method of claim 10, further including the step of delegating use of said microprocessor from said second application to a third application stored on said IC card.

23. The method of claim 22, wherein a third data space for said third application is allocated which includes a volatile memory segment for referencing temporary data and non-volatile memory segment for referencing static data, wherein said third application's volatile segment includes a public and dynamic portion.

24. An apparatus for processing a plurality of applications stored in a memory of a single integrated circuit card comprising:
    means for allocating a data space comprising at least a non-volatile memory segment for referencing static data and a volatile memory segment for referencing temporary data; means for executing a first application; means for interrupting execution of said first application, means for saving data from at least a portion of said volatile memory segment; and means for executing a second application; means for retrieving said saved data; and means for completing said execution of said first application.

25. The apparatus of claim 24, further including means for storing said first application's identity on a data stack.

26. The apparatus of claim 25, further including means for inquiring of said first application's identity.

27. The apparatus of claim 24, wherein said first application's non-volatile memory segment is divided into at least two regions, including a public region and a dynamic region.

28. The apparatus of claim 27, wherein said public region references random access memory.

29. The apparatus of claim 27, wherein said dynamic region references random access memory.

30. The apparatus of claim 24, further including means for allocating a second data space including at least two segments for said second application.

31. The apparatus of claim 30, wherein said second data space includes a volatile memory segment for referencing temporary data and a non-volatile memory segment for referencing static data.

32. The apparatus of claim 31, wherein said second data space's non-volatile segment is divided into at least two regions, including a public region and a dynamic region.

33. The apparatus of claim 32, wherein said public region references random access memory.

34. The apparatus of claim 32, wherein said dynamic region references random access memory.

35. The apparatus of claim 24, further including means for delegating operation of said IC card from said second application to a third application stored on said IC card.

36. The apparatus of claim 35, wherein a third data space for said third application is allocated which includes a volatile memory segment for referencing temporary data and non-volatile memory segment for referencing temporary data, wherein said third application's volatile memory segment includes a public and dynamic portion.

37. A system for processing a plurality of applications stored on an IC card comprising:
- a non-volatile memory coupled to a databus;
- a volatile memory coupled to said databus;
- a first and second application program stored in said non-volatile memory, wherein each application has an associated identifier;
- a data stack accessible by said databus for storing said applications' identifier if said application is interrupted during its execution;
- processor means for executing instructions from said application programs wherein said processor means allocates a data memory space for said application which is being executed and said data memory space is mapped to at least one address in said non-volatile memory and at least one address in said volatile memory; and
- wherein said processor means interrupts said first application at least once during its execution to execute said second application.

38. The system of claim 37, wherein data memory space comprises at least a volatile memory segment for referencing temporary data stored in said volatile memory and a non-volatile memory segment for referencing static data stored in said non-volatile memory.

39. The system of claim 37, further including means for storing said first application's identity on a data stack.

40. The system of claim 39, further including means for inquiring of said first application's identity.

41. The system of claim 38, wherein said first application's non-volatile memory segment is divided into at least two regions, including a public region and a dynamic region.

42. The system of claim 41, wherein said public region references random access memory.

43. The system of claim 4 1, wherein said dynamic region references random access memory.

44. The system of claim 37, further including means for allocating a second data space including at least two segments for said second application.

45. The system of claim 44, wherein said second data space comprises at least a volatile memory segment for referencing temporary data and a non-volatile memory segment for referencing static data.

46. The system of claim 45, wherein said second data space's non-volatile segment is divided into at least two regions, including a public region and a dynamic region.

47. The system of claim 46, wherein said public region references random access memory.

48. The system of claim 46, wherein said dynamic region references random access memory.

49. The system of claim 37, further including means for delegating use of said processor means from said second application to a third application stored on said IC card.

50. The system of claim 49, wherein a third data space for said third application is allocated which includes a volatile memory segment for referencing temporary data and non-volatile memory segment for referencing temporary data, wherein said third application's volatile memory segment includes a public and dynamic portion.

51. An integrated circuit card comprising:
- a plurality of applications and a microprocessor for controlling execution of said applications wherein execution of at least one first application is interrupted and execution is transferred to another second application, further comprising means for sharing data by said first and second applications and means for resuming execution of said first application at the appropriate location at least after completion of execution of said second application.

52. The integrated circuit card of claim 51, further comprising means for allocating a data memory space comprises at least a volatile memory segment for referencing temporary data stored in said volatile memory and a non-volatile memory segment for referencing static data stored in said non-volatile memory.

53. The integrated circuit card of claim 51, further including means for storing said first application's identity on a data stack.

54. The integrated circuit card of claim 53 further including means for inquiring of said first application's identity.

55. The integrated circuit card of claim 52, wherein said first application's non-volatile memory segment is divided into at least two regions, including a public region and a dynamic region.

56. The integrated circuit card of claim 55, wherein said public region references random access memory.

57. The integrated circuit card of claim 55, wherein said dynamic region references random access memory.

58. The integrated circuit card of claim 52, further including means for allocating a second data space including at least two segments for said second application.

59. The integrated circuit card of claim 58, wherein said second data space comprises at least a volatile memory segment for referencing temporary data and a non-volatile memory segment for referencing static data.

60. The integrated circuit card of claim 58, wherein said second data space's non-volatile segment is divided into at least two regions, including a public region and a dynamic region.

61. The integrated circuit card of claim 58, wherein said public region references random access memory.

62. The integrated circuit card of claim 60, wherein said dynamic region references random access memory.

63. The integrated circuit card of claim 51, further including means for delegating use of said processor means from said second application to a third application stored on said IC card.

* * * * *

UNITED STATES PATENT AND TRADEMARK OFFICE
CERTIFICATE OF CORRECTION

PATENT NO.    : 6,220,510 B1
DATED         : April 24, 2001
INVENTOR(S)   : Everett et al.

It is certified that error appears in the above-identified patent and that said Letters Patent is hereby corrected as shown below:

Title page,
Item [56], References Cited, FOREIGN PATENT DOCUMENTS,
-- 0547741       9/1992       (EP) -- should be added
-- WO 9101538    2/1999       (WO) -- should be added Column 2,
Line 62, "fuinction" should read -- function --

Column 13,
Line 55, "comprise" should read -- comprises --
Line 64, "circuit:" should read -- circuit, comprising --

Column 14,
Line 49, "non-" should read -- a non- --
Line 52, "dynamic" should read -- a dynamic --
Line 61, "application," should read -- application; --
Line 62, "and" should be deleted Column 15,
Line 28, "non-volatile" should read -- a non-volatile --
Line 30, "dynamic" should read -- a dynamic --
Line 34, "second" should read -- a second --
Line 46, "memory; and" should read -- memory, --

UNITED STATES PATENT AND TRADEMARK OFFICE
CERTIFICATE OF CORRECTION

PATENT NO. : 6,220,510 B1
DATED : April 24, 2001
INVENTOR(S) : Everett et al.

It is certified that error appears in the above-identified patent and that said Letters Patent is hereby corrected as shown below:

Column 16,
Line 16, "non-" should read -- a non- --
Line 19, "dynamic" should read -- a dynamic --
Line 23, "at least one first" should read -- at least one, first --
Line 24, "another second" should read -- another, second --
Line 31, "comprises" should read -- comprising --

Signed and Sealed this

First Day of July, 2003

JAMES E. ROGAN
*Director of the United States Patent and Trademark Office*